United States Patent [19]
Konishi et al.

[11] Patent Number: 5,141,974
[45] Date of Patent: Aug. 25, 1992

[54] EPOXY RESIN COMPOSITION

[75] Inventors: Isako Konishi; Yasuyuki Murata; Ryohei Tanaka, all of Yokkaichi; Yoshinori Nakanishi, Suzuka, all of Japan

[73] Assignee: Shell Oil Company, Houston, Tex.

[21] Appl. No.: 537,398

[22] Filed: Jun. 13, 1990

[30] Foreign Application Priority Data

Jun. 13, 1989 [JP] Japan .................. 1-148282

[51] Int. Cl.$^5$ .............. C08L 63/00; C08F 283/10
[52] U.S. Cl. ................... 523/466; 525/481; 525/485; 525/486
[58] Field of Search .......... 525/481, 485, 486; 523/466

[56] References Cited

U.S. PATENT DOCUMENTS

| | | | |
|---|---|---|---|
| 3,989,531 | 11/1976 | Orlando et al. | 106/15 FP |
| 4,058,570 | 11/1977 | Kinson et al. | 260/620 |
| 4,072,656 | 2/1978 | Hartmann | 260/47 EN |
| 4,153,621 | 5/1979 | Hartmann | 260/348.64 |
| 4,647,648 | 3/1987 | Silvis et al. | 528/102 |

FOREIGN PATENT DOCUMENTS

| | | |
|---|---|---|
| 213592 | 3/1987 | European Pat. Off. |
| 235990 | 9/1987 | European Pat. Off. |
| 0403022 | 12/1990 | European Pat. Off. |
| 58-39677 | 3/1983 | Japan |
| 58-170774 | 10/1983 | Japan |
| 61-47725 | 3/1986 | Japan |

Primary Examiner—Melvyn I. Marquis
Assistant Examiner—Christopher P. Rogers

[57] ABSTRACT

A composition is disclosed which comprises the reaction product of a diglycidyl ether of a 4,4'-dihydroxybiphenyl and a polyhydric phenol having an average of 2.3 to 10 hydroxyl groups per molecule. The described epoxy resin is particularly useful in phenolic-cured electrical encapsulation formulations.

11 Claims, No Drawings

EPOXY RESIN COMPOSITION

BACKGROUND OF THE INVENTION

This invention relates to epoxy resin compositions. In one aspect, the invention relates to the preparation of low-stress epoxy resin compositions useful in encapsulating electrical components.

Epoxy resins are used to encapsulate electrical components such as integrated circuits. The optimum properties for encapsulation resins include low melting point in the uncured state (to permit encapsulation of the component at a relatively low temperature), high glass transition temperature in the cured state (to permit encapsulation of a component which can tolerate high operating temperatures), low modulus and low coefficient of thermal expansion of the cured resin (properties related to the ability of the cured resin to resist "stress" or cracking at high operating temperatures, which results in damage to the semiconductive elements) and fast cure (to permit maximum speed and productivity in assembly).

One class of epoxy resin used in electrical encapsulation is epoxidized orthocresol novolac (EOCN) resins. EOCN resins have high glass transition temperatures and good moisture resistance, but they are subject to "stress" or cracking under high operating temperatures.

Another class of epoxy resins suitable for electrical encapsulation are diglycidyl ether of 4,4'-dihydroxybiphenyls. These epoxy resins have the highly desirable property of low modulus, which is an indication of the ability of the cured resin to resist cracking during high temperature use. However, for some encapsulation applications, the softening point of the resin is undesirably high. Furthermore, the melt viscosity is quite low, which can result in flashes when the resin is subjected to transfer molding operations.

It is therefore an object of the invention to provide an epoxy resin suitable for electrical encapsulation applications. In a specific aspect, it is an object to provide a low-modulus encapsulation formulation which has a reduced tendency to flash during transfer molding.

SUMMARY OF THE INVENTION

According to the invention, an epoxy resin composition is provided comprising the reaction product of a diglycidyl ether of a 4,4'-dihydroxybiphenyl and from about 0.05 to about 0.6 equivalents per mole of the diglycidyl ether of a polyhydric phenol having an average of 2.3 to 10 hydroxyl groups per molecule. Further according to the invention, an electrical encapsulation composition comprising the described epoxy resin, an effective amount of a phenolic curing agent for the epoxy resin and at least about 50 weight percent of an inorganic filler.

DETAILED DESCRIPTION OF THE INVENTION

The invention composition is a curable reaction product of (a) a diglycidyl ether of a 4,4'-dihydroxybiphenyl which can be described by chemical structure I:

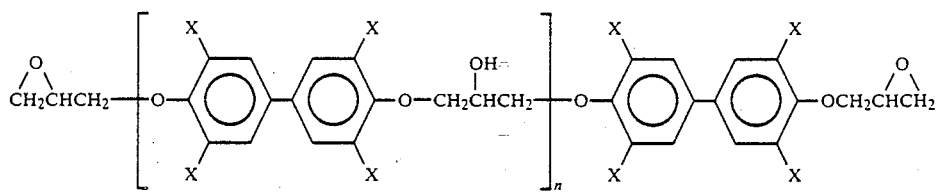

in which each X is independently selected from H, halide and $C_{1-5}$ alkyl, preferably methyl and ethyl, and (b) a polyhydric phenol which has an average phenolic hydroxyl group content within the range of about 2.3 to 10. Examples of suitable diglycidyl ethers include the diglycidyl ethers of such biphenols as 4,4'-dihydroxybiphenyl; 3,3',5,5'-tetramethyl-4,4'-dihydroxybiphenyl; 3,3',5,5'-tetraethyl-4,4'-dihydroxybiphenyl; 3,3',5,5'-tetrapropyl-4,4'-dihydroxybiphenyl, and the like.

Examples of suitable polyhydric phenols include, for example, phenol novolac, brominated phenol novolac, cresol novolac, brominated cresol novolac, resorcinol novolac, brominated resorcinol novolac, bisphenol-A novolac, and polyhydric phenols derived from p-hydroxybenzaldehyde and salicylaldehyde and the like. Suitable polyhydric phenols will be selected to have an average phenolic hydroxyl group content within the range 2.3 to 10. A lower phenolic hydroxyl group content will result in an unacceptable lowering of the glass transition temperature, whereas a higher phenolic hydroxyl group content will result in a product susceptible to gelation.

The invention composition can be prepared by contacting about 0.05 to about 0.6 phenolic hydroxyl groups of the phenolic compound per epoxide group of the diglycidyl ether, in the presence of a catalyst effective to promote reaction between the epoxy groups and the phenolic hydroxyl groups. Examples of suitable catalysts include quaternary ammonium salts such as tetramethylammonium hydroxide and tetraammonium chloride; phosphorus compounds such as triphenylphosphine; and imidazoles. The catalyst will generally be present in the reaction mixture in an amount within the range of about 50 to about 1000 PPM based on the epoxy resin. The reaction is generally carried out with stirring at a temperature within the range of about 100° to 200° C. for a period of about 1 to 5 hours.

The invention epoxy resin composition is particularly useful in electrical encapsulation formulations, which will include a curing agent for the epoxy resin. The preferred curing agents are phenolic compounds such as phenolic novolacs and orthocresol novolacs. The composition can include optional cure accelerators such as 2-methylimidazole, 2-ethyl-4-methylimidazole, 2,4,6-tris(dimethylaminomethyl)phenol, benzyldimethylamine, tributylphosphine and triphenylphosphine; mold release agents such as natural wax, synthetic wax, higher fatty acids, metal salts of higher fatty acids and paraffins; and fire retardants such as brominated epoxy resins, antimony trioxide and triphenylphosphate.

The encapsulation composition will include at least about 50 weight percent, based on the weight of the composition, of an inorganic filler such as fused silica, crystalline silica, glass powder, alumina, zircon and the like.

The compositions are preferably prepared by melt-blending the components by roll mixing and extruding.

EXAMPLE 1

This example illustrates the preparation of an epoxy resin reaction product of the diglycidyl ether of 3,3',5,5'-tetramethyl-4,4'-dihydroxybiphenyl (EPIKOTE® YX-4000, a product of Yuka Shell Epoxy K.K. having an epoxy equivalent weight of 185 g/eq). In a reactor equipped with a stirrer and a thermometer was stirred with heating at 120° C. a mixture consisting of 200 g of the diglycidyl ether of 3,3',5,5'-tetramethyl-4,4'-dihydroxybiphenyl and 20 g of phenol novolac (4.3 phenolic hydroxyl groups per molecule), and then the resulting reaction mixture, after the addition of 0.4 g of a 10% aqueous solution of tetramethylammonium hydroxide, was reacted at 160° C. for three hours. The ratio of phenolic hydroxyl groups to epoxy groups in the reaction was 0.18. The resulting epoxy resin had an epoxy equivalent weight of 252 g/eq and a softening point of 55° C.

EXAMPLE 2

The procedure of Example 1 was repeated using with 60 g of the phenolic novolac. The phenolic hydroxyl group to epoxy ratio was 0.54. The resulting epoxy resin had an epoxy equivalent weight of 545 g/eq and a softening point of 83° C.

EXAMPLE 3

Example 1 was repeated except that 30 g of o-cresol novolac having an average phenolic hydroxyl group content of 4.5 was used. The ratio of phenolic hydroxyl groups to epoxy groups was 0.24. The resulting epoxy resin had an epoxy equivalent weight of 281 g/eq and a softening point of 61° C.

EXAMPLE 4

The procedure of Example 1 was repeated except that 30 g of a polyhydric phenol derived from salicylaldehyde and phenol having an average phenolic hydroxyl group content of 5.7 was used. The hydroxyl/epoxy group ratio was 0.28. The epoxy equivalent weight of the resulting epoxy resin was 298 g/eq and the softening point was 65° C.

EXAMPLE 5

The procedure of Example 2 was repeated except that 200 g of the diglycidyl ether of 4,4'-dihydroxybiphenyl (epoxy eq. weight 160 and softening point 160° C.). The ratio of phenolic hydroxyl to epoxy groups was 0.47. The resulting epoxy resin had an epoxy equivalent weight of 413 g/eq and a softening point of 77° C.

EXAMPLE 6

The procedure of Example 4 was repeated except that 200 g of the diglycidyl ether of 4,4'-dihydroxybiphenyl were used. The ratio of phenolic hydroxyl groups to epoxy groups was 0.25. The resulting epoxy resin had an epoxy equivalent weight of 254 g/eq and a softening point of 58° C.

Table 1 provides a summary of the compositions prepared in Examples 1-6.

TABLE 1

|  | Examples | | | | | |
|---|---|---|---|---|---|---|
|  | 1 | 2 | 3 | 4 | 5 | 6 |
| Compositions | | | | | | |
| Glycidylether of 3,3',5,5'-tetramethyl-4,4'-dihydroxybiphenyl | 200 | 200 | 200 | 200 | — | — |
| Glycidylether of 4,4'-dihydroxybiphenyl | — | — | — | — | 200 | 200 |
| Phenyl novolac | 20 | 60 | — | — | 60 | — |
| O-cresol novolac | — | — | 30 | — | — | — |
| Polyhydric phenol derived from salcylaldehyde and phenol | — | — | — | 30 | — | 30 |
| Reaction ratio of the number of phenolic hydroxyl group/the number of epoxy group | 0.18 | 0.54 | 0.24 | 0.28 | 0.47 | 0.25 |
| Physical Properties | | | | | | |
| Epoxy equivalent (g/eq) | 252 | 541 | 281 | 298 | 413 | 254 |
| Softening point | 55 | 83 | 61 | 65 | 77 | 58 |

EXAMPLE 7

Molding composition were prepared from the epoxy resin compositions prepared in Examples 1-6 and from comparison epoxy resins. Formulations shown in Table 2 were melt-blended at 90° C. for 5 minutes, formed into a sheet, cooled and then ground. Properties of the molding formulations are shown in Table 2.

As can be seen from the results in Table 2, the invention compositions provided encapsulation formulations which were relatively high in cure rate and superior in moldability, while retaining excellent resistance to high-temperature cracking.

TABLE 2

| Epoxy resin (parts by weight) | Example 1 (100) | Example 2 (100) | Example 3 (100) | Example 4 (100) | Comparison DGE[(1)] (100) | Comparison EOCN[(2)] (100) | Example 5 (100) | Example 6 (100) | DGE of 4,4'-dihydroxybiphenyl (100) |
|---|---|---|---|---|---|---|---|---|---|
| Formulations (parts by weight) | | | | | | | | | |
| Phenol resin | 43.4 | 21.6 | 39.2 | 37.1 | 58.2 | 53.3 | 27.5 | 43.1 | 66.9 |
| Silica powder | 358 | 307 | 348 | 343 | 392 | 381 | 321 | 357 | 413 |

TABLE 2-continued

| Epoxy resin (parts by weight) | Example 1 (100) | Example 2 (100) | Example 3 (100) | Example 4 (100) | Comparison DGE[1] (100) | Comparison EOCN[2] (100) | Example 5 (100) | Example 6 (100) | DGE of 4,4'-dihydroxybiphenyl (100) |
|---|---|---|---|---|---|---|---|---|---|
| Triphenyl phosphine | 1.0 | 1.0 | 1.0 | 1.0 | 1.0 | 1.0 | 1.0 | 1.0 | 1.0 |
| Brominated bisphenol-A type epoxy resin | 10 | 10 | 10 | 10 | 10 | 10 | 10 | 10 | 10 |
| Antimony trioxide | 10 | 10 | 10 | 10 | 10 | 10 | 10 | 10 | 10 |
| Carnauba wax | 1.0 | 1.0 | 1.0 | 1.0 | 1.0 | 1.0 | 1.0 | 1.0 | 1.0 |
| Epoxy silane | 1.0 | 1.0 | 1.0 | 1.0 | 1.0 | 1.0 | 1.0 | 1.0 | 1.0 |
| Properties | | | | | | | | | |
| Gel time at 150° C. (sec)[3] | 215 | 180 | 208 | 205 | 295 | 195 | 174 | 185 | 230 |
| Resin flash[4] | 1.0 | 0.6 | 0.9 | 0.7 | 4.2 | 0.6 | 0.6 | 1.0 | 4.3 |
| Glass transition temperature (°C.)[5] | 145 | 143 | 144 | 148 | 145 | 165 | 145 | 152 | 150 |
| Thermal resistance under soldering[6] | 0/16 | 1/16 | 0/16 | 0/16 | 0/16 | 13/16 | 1/16 | 0/16 | 0/16 |
| Bending modulus (kg/mm$^2$) | 1430 | 1470 | 1440 | 1420 | 1430 | 1560 | 1480 | 1470 | 1470 |

[1]Diglycidyl ether of 3,3',5,5'-tetramethyl-4,4'-dihydroxybiphenyl.
[2]EPIKOTE ® 180H65 epoxy orthocresol novolac resin from Yuka Shell Epoxy K.K.
[3]Determined by hotbench test.
[4]Resin flash measured in length after molding in a low-pressure transfer mold machine at a mold temperature of 180° C., mold pressure of 70 kg/cm$^2$ and mold time of 180 sec.
[5]Determined by TMA on test piece molded at 70 kg/cm$^2$ for 180 sec, followed by curing at 180° C. for 8 hours.
[6]Test pieces were molded at 180° C. and 70 kg/cm$^2$ for 180 sec to make flat plastic packages (44 pin FPP), which were postcured at 180° C. for 8 hours. Sixteen test pieces were exposed to moisture at 85° C. and 85% RH for 168 hours, followed by vapor phase flow treatment at 215° C. for 90 sec, and the number of cracked test pieces were noted.

We claim:

1. A curable epoxy resin which is the product of reacting (a) a diglycidyl ether of a 4,4'-dihydroxybiphenyl and (b) a polyhydric phenol having an average phenolic hydroxyl group content per molecule within the range of 2.3 to 10, reacted in an amount within the range of 0.05 to 0.6 phenolic hydroxyl groups per epoxide group of (a).

2. The curable epoxy resin of claim 1 in which component (a) is a diglycidyl ether which can be represented by the formula

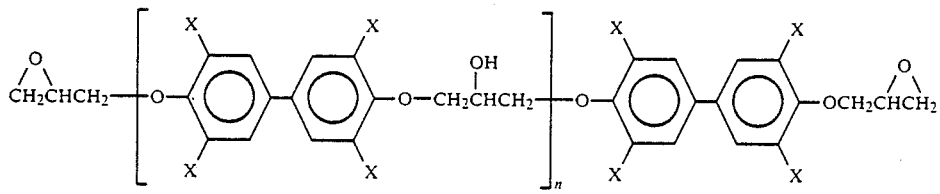

in which each X is independently selected from H, halide and $C_{1-5}$ alkyl, and n is an average number within the range of 0 to 3.

3. The curable epoxy resin of claim 2 in which component (a) is selected from diglycidyl ethers of 4,4'-dihydroxybiphenyl and 3,3',5,5'-tetramethyl-4,4'-dihydroxybiphenyl.

4. The curable epoxy resin of claim 1 in which the polyhydric phenol is a phenolic novolac.

5. The curable epoxy resin of claim 3 in which the polyhydric phenol is an orthocresol novolac.

6. An electrical encapsulation composition comprising:
 (a) a curable epoxy resin which is the product of reacting (i) a diglycidyl ether of a 4,4'-dihydroxybiphenyl and (ii) a polyhydric phenol having an average phenolic hydroxyl group content per molecule within the range of 2.3 to 10, reacted in an amount within the range of 0.05 to 0.6 phenolic hydroxyl groups per epoxide group of (i);
 (b) a curing amount of a phenolic curing agent for the epoxy resin;
 (c) at least about 50 weight percent, based on the weight of the composition, of an inorganic filler.

7. The composition of claim 6 in which (i) is a diglycidyl ether which can be represented by the formula

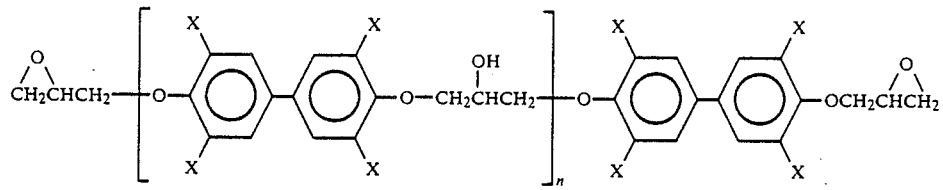

in which each X is independently selected from H, halide and $C_{1-5}$ alkyl, and n is an average number within the range of 0 to 3.

8. The composition of claim 7 in which (i) is selected from diglycidyl ethers of 4,4'-dihydroxybiphenyl and 3,3',5,5'-tetramethyl-4,4'-dihydroxybiphenyl.

9. The composition of claim 7 in which (ii) is a phenolic novolac.

10. The composition of claim 7 in which (ii) is an orthocresol novolac.

11. The composition of claim 7 which further comprises a cure accelerating amount of triphenyl phosphine.